US008922589B2

(12) United States Patent
Laor

(10) Patent No.: US 8,922,589 B2
(45) Date of Patent: Dec. 30, 2014

(54) AUGMENTED REALITY APPARATUS

(71) Applicant: Laor Consulting LLC, Denver, CO (US)

(72) Inventor: Herzel Laor, Boulder, CO (US)

(73) Assignee: Laor Consulting LLC, Denver, CO (US)

( * ) Notice: Subject to any disclaimer, the term of this patent is extended or adjusted under 35 U.S.C. 154(b) by 0 days.

(21) Appl. No.: 14/053,607

(22) Filed: Oct. 15, 2013

(65) Prior Publication Data

US 2014/0300632 A1  Oct. 9, 2014

Related U.S. Application Data

(60) Provisional application No. 61/809,415, filed on Apr. 7, 2013.

(51) Int. Cl.
*G09G 5/00* (2006.01)
*G06T 19/00* (2011.01)

(52) U.S. Cl.
CPC .................................. *G06T 19/006* (2013.01)
USPC ......................................................... 345/633

(58) Field of Classification Search
CPC ..... G06T 19/006; G09G 5/377; G02B 27/017
USPC .................................................. 345/440, 633
See application file for complete search history.

(56) References Cited

U.S. PATENT DOCUMENTS

| | | |
|---|---|---|
| 5,581,276 A | 12/1996 | Cipolla et al. |
| 6,307,526 B1 | 10/2001 | Mann |
| 6,634,749 B1 | 10/2003 | Morrison et al. |
| 6,765,569 B2 | 7/2004 | Neumann et al. |
| 7,120,875 B2 | 10/2006 | Daily et al. |
| 7,162,054 B2 | 1/2007 | Meisner et al. |
| 7,190,331 B2 | 3/2007 | Genc et al. |
| 7,239,330 B2 | 7/2007 | Sauer et al. |
| 7,274,380 B2 | 9/2007 | Navab et al. |

(Continued)

FOREIGN PATENT DOCUMENTS

EP  1798587  6/2007

OTHER PUBLICATIONS

Mann, Steve; "What I've learned from 35 years of wearing computerized eyewear", spectrum.ieee.org, North American; Mar. 2013, pp. 42-47.

(Continued)

*Primary Examiner* — Maurice L McDowell, Jr.
*Assistant Examiner* — Kyle Zhai
(74) *Attorney, Agent, or Firm* — A.C. Entis-IP Ltd.

(57) ABSTRACT

An embodiment of the invention relates to an apparatus and related methods for providing a person with an augmented reality, the apparatus comprising: a projector that projects light that generates an augmenting visual image (AVI); optics that directs to a camera a portion of the projected light and a portion of light arriving from a scene so that a combined image comprising an image of the scene and the AVI are generated in a photosensor in the camera; and a controller that processes the combined image to compare positions of homologous features in the image of the scene with positions of corresponding location markers in the AVI, and renders an adjusted AVI based on the comparison, so that the location markers and the corresponding homologous features are substantially coincident in the combined image.

21 Claims, 9 Drawing Sheets

(56) References Cited

U.S. PATENT DOCUMENTS

| | | | |
|---|---|---|---|
| 7,542,051 B2 | 6/2009 | Matsui et al. | |
| 7,595,933 B2 | 9/2009 | Tang | |
| 7,599,789 B2 | 10/2009 | Leonard et al. | |
| 7,657,065 B2 | 2/2010 | Kotake et al. | |
| 7,728,869 B2 | 6/2010 | Jung | |
| 7,817,104 B2 | 10/2010 | Ryu et al. | |
| 8,225,226 B2 | 7/2012 | Skourup et al. | |
| 2002/0167536 A1 | 11/2002 | Valdes et al. | |
| 2003/0076996 A1 | 4/2003 | Neumann et al. | |
| 2003/0227470 A1 | 12/2003 | Gene et al. | |
| 2004/0104935 A1 | 6/2004 | Williamson et al. | |
| 2004/0131232 A1 | 7/2004 | Meisner et al. | |
| 2005/0203380 A1 | 9/2005 | Sauer et al. | |
| 2005/0215879 A1 | 9/2005 | Chuanggul | |
| 2005/0231419 A1 | 10/2005 | Mitchell | |
| 2006/0026140 A1 | 2/2006 | King et al. | |
| 2006/0176242 A1 | 8/2006 | Jaramaz et al. | |
| 2006/0184003 A1 | 8/2006 | Lewin et al. | |
| 2006/0250322 A1 | 11/2006 | Hall et al. | |
| 2007/0038944 A1 | 2/2007 | Carignano et al. | |
| 2007/0146391 A1 | 6/2007 | Pentenrieder et al. | |
| 2007/0164988 A1 | 7/2007 | Ryu et al. | |
| 2007/0242886 A1 | 10/2007 | St John | |
| 2010/0002909 A1 | 1/2010 | Lefevre | |
| 2010/0045701 A1 | 2/2010 | Scott et al. | |
| 2011/0287811 A1 | 11/2011 | Mattila et al. | |
| 2011/0306986 A1 | 12/2011 | Lee et al. | |
| 2011/0313779 A1 | 12/2011 | Herzog et al. | |
| 2011/0316845 A1 | 12/2011 | Roberts et al. | |
| 2012/0032977 A1 | 2/2012 | Kim et al. | |
| 2012/0038670 A1 | 2/2012 | Choi et al. | |
| 2012/0044264 A1 | 2/2012 | Lee et al. | |
| 2012/0050143 A1 | 3/2012 | Border et al. | |
| 2012/0050305 A1 | 3/2012 | Song et al. | |
| 2012/0050493 A1 | 3/2012 | Ernst et al. | |
| 2012/0120103 A1 | 5/2012 | Border et al. | |
| 2012/0135745 A1* | 5/2012 | Kaplan | 455/456.1 |
| 2012/0212508 A1 | 8/2012 | Kimball | |
| 2012/0249741 A1 | 10/2012 | Maciocci et al. | |
| 2013/0016070 A1* | 1/2013 | Starner et al. | 345/175 |
| 2013/0038707 A1 | 2/2013 | Cunningham et al. | |
| 2013/0093759 A1* | 4/2013 | Bailey | 345/419 |
| 2013/0235191 A1* | 9/2013 | Miao et al. | 348/143 |
| 2013/0258486 A1* | 10/2013 | Ionescu et al. | 359/630 |
| 2013/0286004 A1* | 10/2013 | McCulloch et al. | 345/419 |

OTHER PUBLICATIONS

Owano, Nancy; "Meta glasses to place virtual reality worlds at fingertips (w/ Video)"; http://phys.org/news/2013-05-meta-glasses-virtual-reality-worlds.html.

International Search Report and Written Opinion of PCT/IL2014/050334 dated Aug. 4, 2014.

* cited by examiner

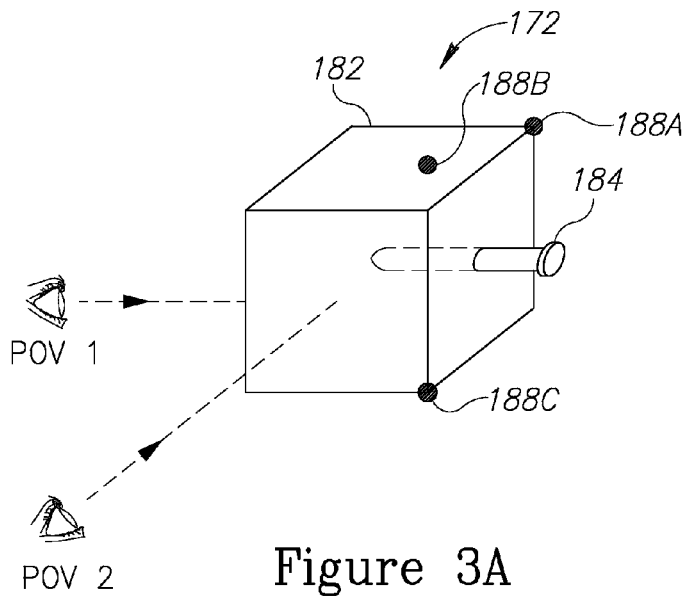
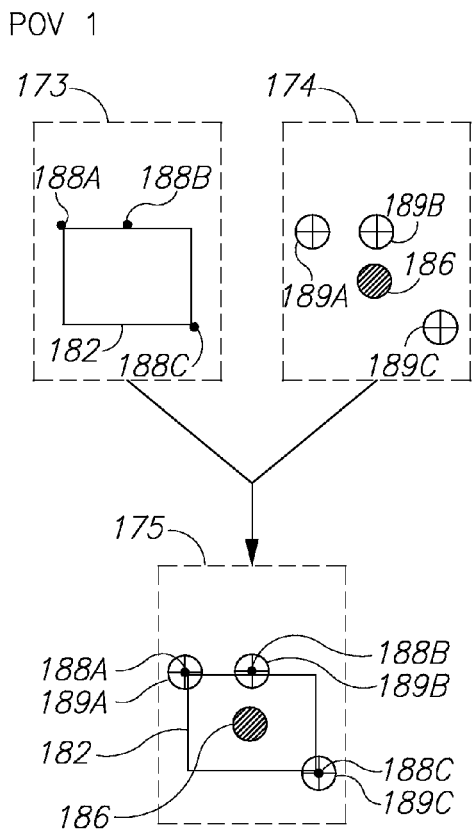
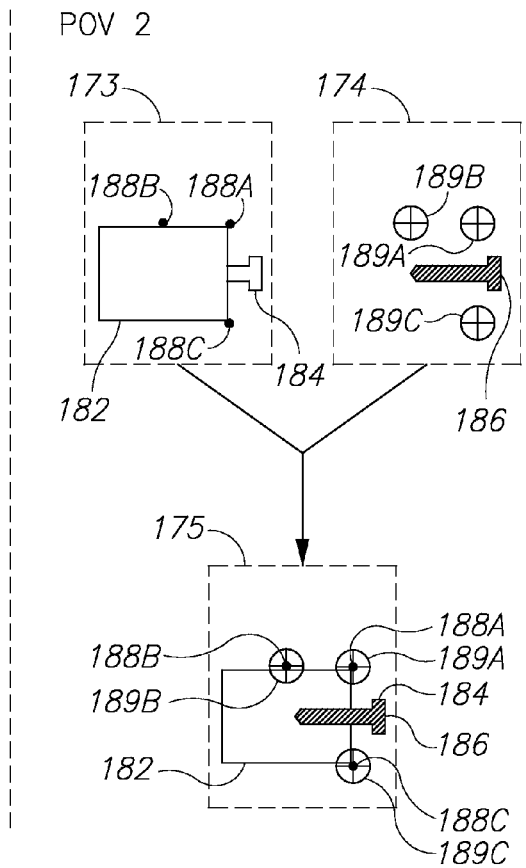
Figure 3A
Figure 3B
Figure 3C

AUGMENTED REALITY APPARATUS

RELATED APPLICATIONS

The present application claims the benefit under 35 U.S.C. 119(e) of U.S. Provisional Application 61/809,415 filed on 7 Apr. 2013, the disclosure of which is incorporated herein by reference in its entirety.

FIELD

Embodiments of the invention relate to an apparatus for providing a person with an augmented reality.

BACKGROUND

In Augmented Reality ("AR") technology, natural vision is supplemented with the addition of an augmenting visual image ("AVI") that overlays a portion of a real time scene in a region of interest in the person's natural field of view ("FOV"). Hereinafter, the portion of the real time scene may be referred to as a "scene". The AVI is typically computer-generated, and is rendered from a computer code (also referred to as an "AVI model") that is stored in a computer memory. The AVI may comprise one or more features ("AVI constructs") that are viewed by the person together with the scene. The AVI constructs may, for example, comprise an image of an object or region in the scene, or an image presenting information regarding the object or region in the scene. A portion of the AVI model that encodes the AVI construct may be referred to as a "construct model".

Typically, the AVI is responsive to the scene, and changes as the scene changes. For example, AVI constructs that are associated with a particular feature in a scene may appear to the person, when viewed together with the scene, to be co-localized with the associated feature. As the person's FOV shifts, the AVI may change and/or shift accordingly to maintain contextual and spatial relevance with the scene.

SUMMARY

An aspect of an embodiment of the invention relates to an apparatus, also referred to as a "referenced augmented reality" ("RAR") apparatus that renders an AVI from an AVI model and combines it with an image of a scene ("scene image") that a person is looking at on the person's retina so that the person sees a combined image in which the AVI is relatively accurately aligned with the scene image. Hereinafter the combined image in accordance with an embodiment of the invention may be referred to as a "RAR image". According to an embodiment of the invention, the AVI includes at least one AVI construct and a plurality of location markers that correspond to locations of selected homologous features in the scene. Accordingly, the AVI model comprises at least one construct model that encodes the at least one AVI construct as well as a "marker model", which is a computer code that encodes the location markers. The RAR apparatus captures and analyzes the RAR image to compare positions of the homologous features in the scene image with positions of the location makers in the AVI, and based on the comparison, if necessary, adjusts the AVI so that the location markers and the corresponding homologous features are substantially coincident in the RAR image.

For convenience of presentation, the homologous features in the scene may be referred to as "fiducials", and the location markers in the AVI may be referred to as "AVI markers".

According to an embodiment of the invention, the RAR apparatus comprises a controller that has the AVI model stored in its computer memory. The controller renders the AVI in a projector and controls the projector to project light that forms the AVI (hereinafter referred to as "AVI light"). The RAR further comprises optics that directs a portion of light arriving from the scene that the person is looking at (hereinafter referred to as "scene light") and a portion of the AVI light to the person so that the person sees the RAR image comprising the scene image overlaid with the AVI. The RAR apparatus further comprises a camera. The optics directs portions of the scene light and the AVI light to the camera to generate a copy of the RAR image on the photosensor of the camera.

In an embodiment of the invention, the controller is operable to process the copy of the RAR image captured by the camera to compare positions of the fiducials in the scene image with the positions of the homologous AVI markers in the AVI and render an adjusted AVI based on the comparison, so that the AVI markers and the images of the fiducials are substantially coincident in the RAR image.

The RAR image directed to the person may be referred to as a "person RAR image" or "PRAR image" and the copy of the RAR image directed to the camera may be referred to as a "camera RAR image" or "CRAR image". The PRAR image and the CRAR image may be referred to generically as the RAR image or combined image. In accordance with an embodiment of the invention, the PRAR image and the CRAR image are "substantially dimensionally identical", that is, except for a possible linear scale factor, the RAR apparatus is substantially free of sources of relative dimensional variances between the PRAR image and the CRAR image. The sources of relative dimensional variances may include parallax error due to the positioning of the eye of the person and the camera, differential chromatic magnification and/or optical aberrations.

According to an embodiment of the invention, the optics may include a partially transmitting/partially reflecting mirror, which receives the scene light and the AVI light, and splits them so that portions of the scene light and the AVI light are directed to the person to generate the PRAR image and portions of the scene light and the AVI light are directed to the camera to generate the CRAR image. In an embodiment of the invention, the optics may optionally be configured to direct the scene light and the AVI light to the person to generate a PRAR image on the retina of a user. The optics is further configured to receive a reflection of the PRAR image from the retina, and direct the reflection of the PRAR image to the camera to generate the CRAR image.

An aspect of an embodiment of the invention relates to a method for providing a person with an AR responsive to a scene that the person views, the method comprising: rendering an AVI that has AVI markers homologous to fiducials in the scene; projecting the AVI; directing the AVI and an image of the scene to the person's eye and a camera; capturing the AVI and the image of the scene; comparing positions of AVI markers in the captured AVI with positions of homologous fiducials in the captured scene image; rendering an adjusted AVI in which the AVI markers are substantially coincident with the homologous fiducials in the capture scene image; projecting the adjusted AVI; and directing the adjusted AVI and the image of the scene to the person's eye and the camera.

In the discussion, unless otherwise stated, adjectives such as "substantially", "relatively" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIG. 3A schematically illustrates a scene viewed from two points of view;

FIGS. 3B-3C schematically illustrates a scene image, an AVI and a RAR image, corresponding to the two points of view of FIG. 3A, in accordance with an embodiment of the invention;

DETAILED DESCRIPTION

Figure 1:
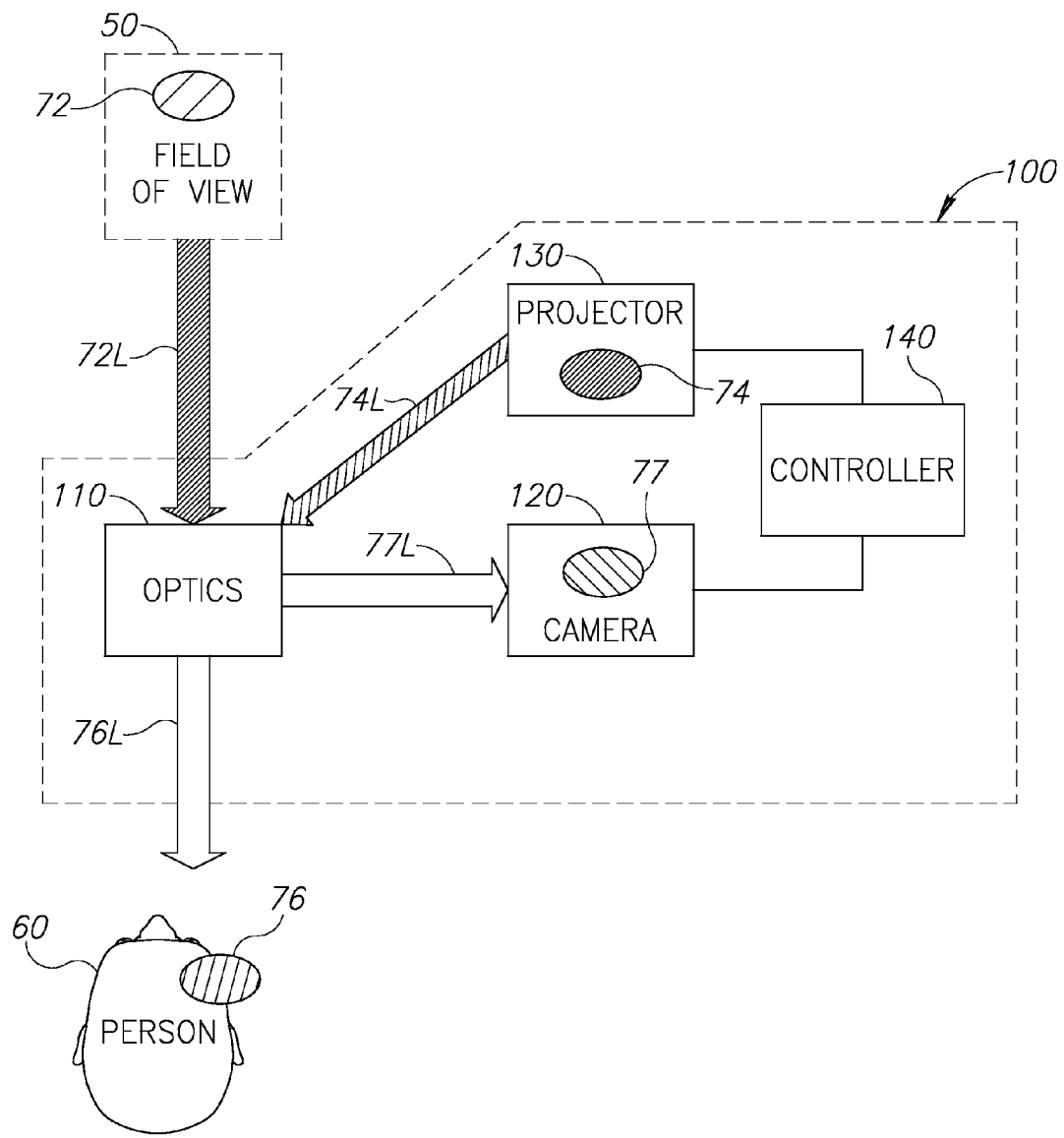
FIG. 1 schematically illustrates a RAR apparatus, in accordance with an embodiment of the invention.
Figure 4A:
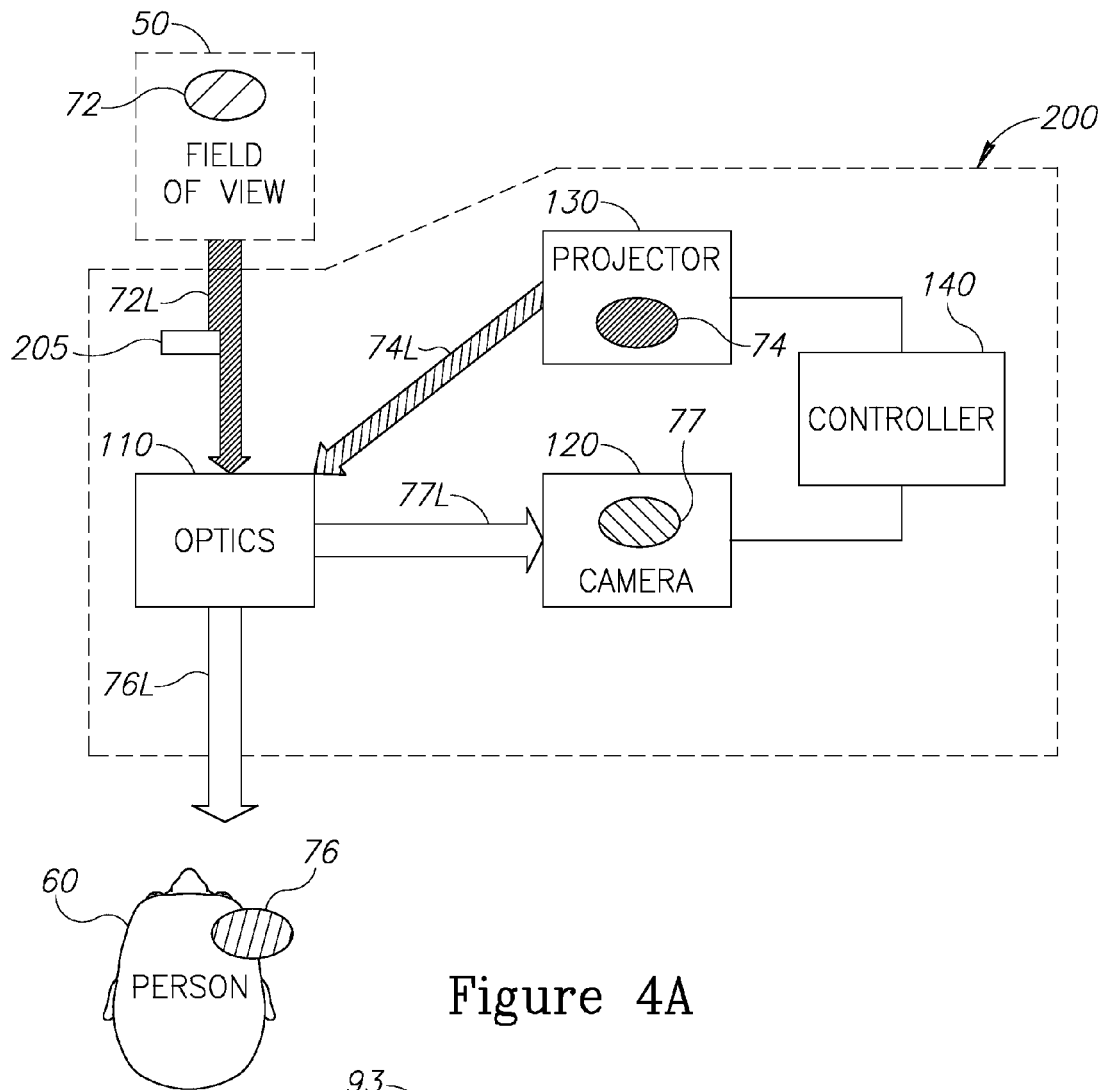
FIG. 4A schematically illustrates a split-field RAR apparatus, in accordance with an embodiment of the invention.
Figure 4B:
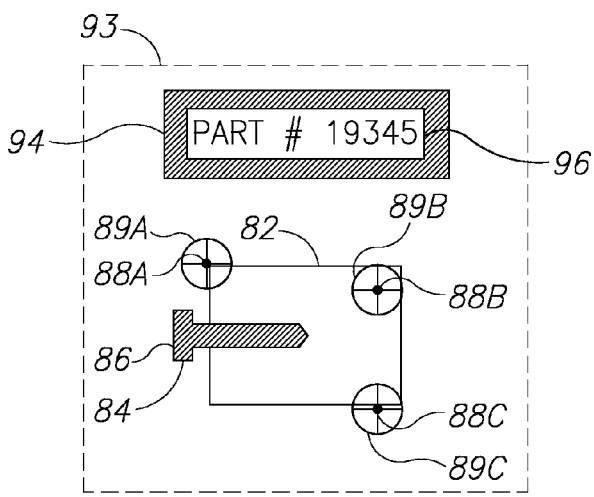
FIG. 4B schematically illustrates a split-field RAR image having an occluded field overlaid with a replacement AVI construct, in accordance with an embodiment of the invention.
Figure 5:
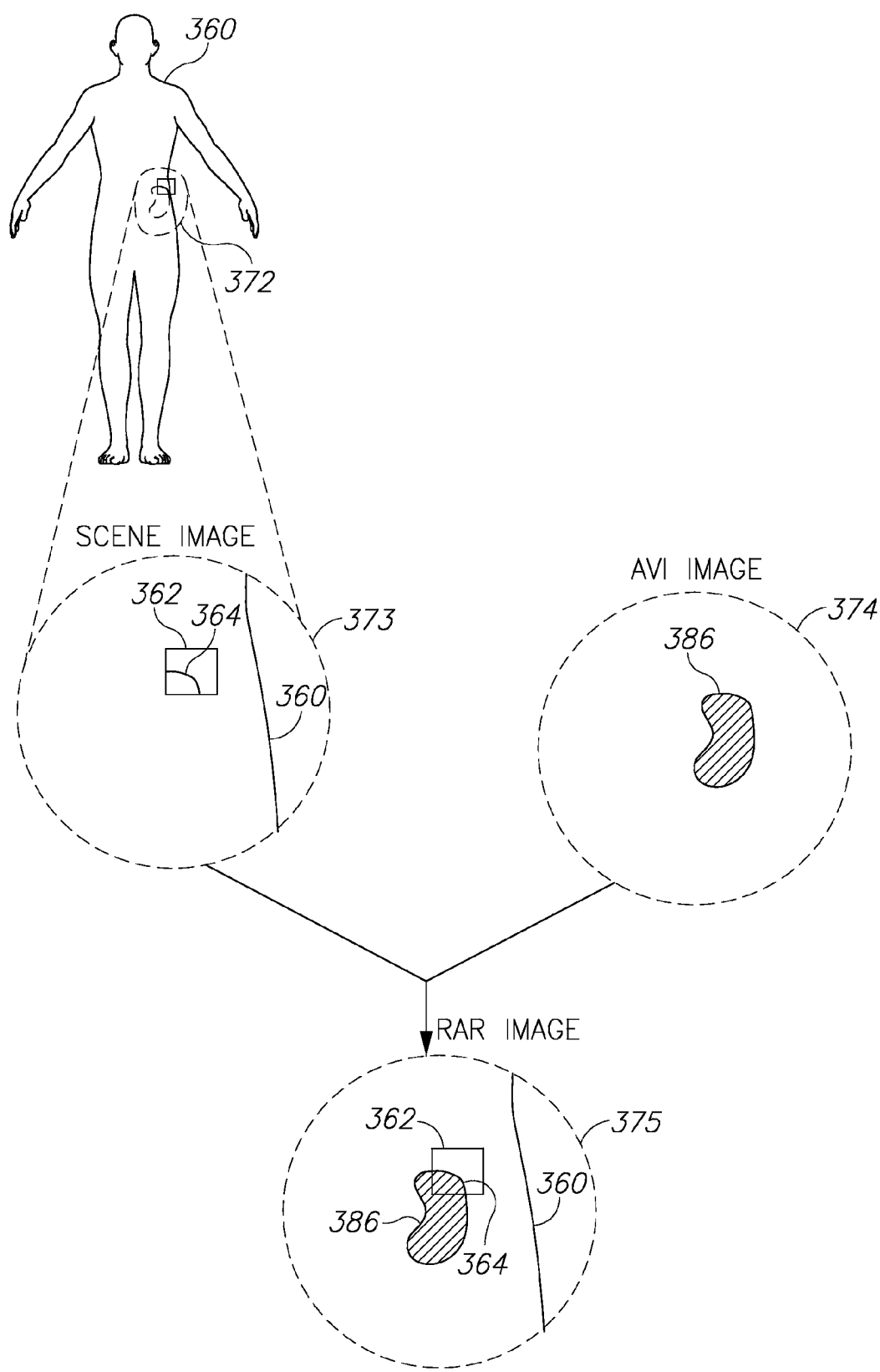
FIG. 5 schematically illustrates a surgery-related example of a scene, a scene image, an AVI and a RAR image, in accordance with an embodiment of the invention.

In the following detailed description, the components of a RAR apparatus in accordance with an embodiment of the invention are schematically illustrated in FIG. 1 and discussed with reference to that figure. FIGS. 2A-2C and 3A-3C and the related descriptions describe providing a scene image, an AVI, and a RAR image for a scene having an object embedded within a substrate. The components of a split-field RAR apparatus and an example of a split-field RAR image are schematically illustrated in FIGS. 4A-4B and discussed with reference to those figures. FIG. 5 and the related description describe providing a scene image, an AVI, and a RAR image for a scene comprising an area around a kidney of a patient in surgery. It will be appreciated that the images (scene image, AVI and RAR images), as generated on a retina of a person or a photosensor of a camera, are inverted (up-down) and reversed (right-left). For clarity of presentation, the images are presented in the figures as right-side-up and not reversed (right-left). Further examples of a RAR apparatus in accordance with an embodiment of the invention, with various exemplary optics and its details and functions, are discussed with reference to FIGS. 6A-6B and 7A-7C. Flowcharts of a method for providing an AR responsive to a scene that the person views, in accordance with an embodiment of the invention, are shown in FIGS. 8A-8B and discussed with reference to the figures.

Reference is now made to FIG. 1, which schematically shows a RAR apparatus 100 for providing a person 60 with an AR responsive to a scene that the person is looking at, schematically represented by an ellipse 72, in a region of interest in a field of view 50 of the person. Scene light that arrives from the scene to RAR apparatus 100 is schematically represented by a block arrow 72L. RAR apparatus 100 comprises optics 110, a camera 120, a projector 130, and a controller 140 connected by wire or wirelessly with the projector and the camera. Controller 140 has in its computer memory an AVI model (not shown) used to render, in projector 130, an AVI 74 (schematically represented by an ellipse 74). Projector 130 projects AVI light that is schematically represented by a block arrow 74L. The AVI model includes at least one construct model and a marker model that are used to generate, respectively, at least one AVI construct (not shown in FIG. 1) and a plurality of AVI markers (not shown in FIG. 1) as parts of AVI 74. The AVI markers are homologous to fiducials in scene 72 (not shown in FIG. 1). Schematic illustrations of exemplary scene images with fiducials and exemplary AVIs with AVI markers, as well as exemplary RAR images, are shown in FIGS. 2A-2B and figures following FIGS. 2A-2B and are discussed with reference to the figures below.

Optics 110 directs a portion of scene light 72L and a portion of AVI light 74L that it receives to person 60 so that person 60 sees a PRAR image, schematically represented by an ellipse 76, that comprises the image of scene 72 overlaid by AVI 74. The combination of the portion of scene light 72L and the portion of AVI light 74L directed by optics 110 to person 60 to generate PRAR image 76 is referred to as "PRAR light". The PRAR light is schematically represented by a block arrow 76L. Optics 110 directs a portion of scene light 72L and a portion of AVI light 74L to a photosensor (not shown) of camera 130 to generate a CRAR image, schematically represented by an ellipse 77, that comprises the image of scene 72 overlaid by AVI 74. The combination of the portion of scene light 72L and the portion of AVI light 74L directed by optics 110 to the photosensor of camera 130 to generate CRAR image 77 is referred to as "CRAR light". The CRAR light is schematically represented by a block arrow 77L.

In accordance with an embodiment of the invention, as discussed below, controller 140 is operable to process CRAR image 77 to compare the positions of the fiducials with the positions of the homologous AVI markers and render an adjusted AVI 74 based on the comparison for projector 130 to project, so that the AVI markers and the fiducials are substantially coincident in PRAR image 76. In accordance with an embodiment of the invention, the PRAR image and the CRAR image are substantially dimensionally identical. In certain embodiments of the invention, dimensional variations between the PRAR image and the CRAR image, if present, may be digitally compensated for by controller 140. For example the differences in lens focal length for different wavelength light may be accounted for and compensated. In certain embodiments of the invention, there may be differences between the intensity of light forming PRAR image 76 and the intensity of light forming CRAR image 77.

Figure 2A:
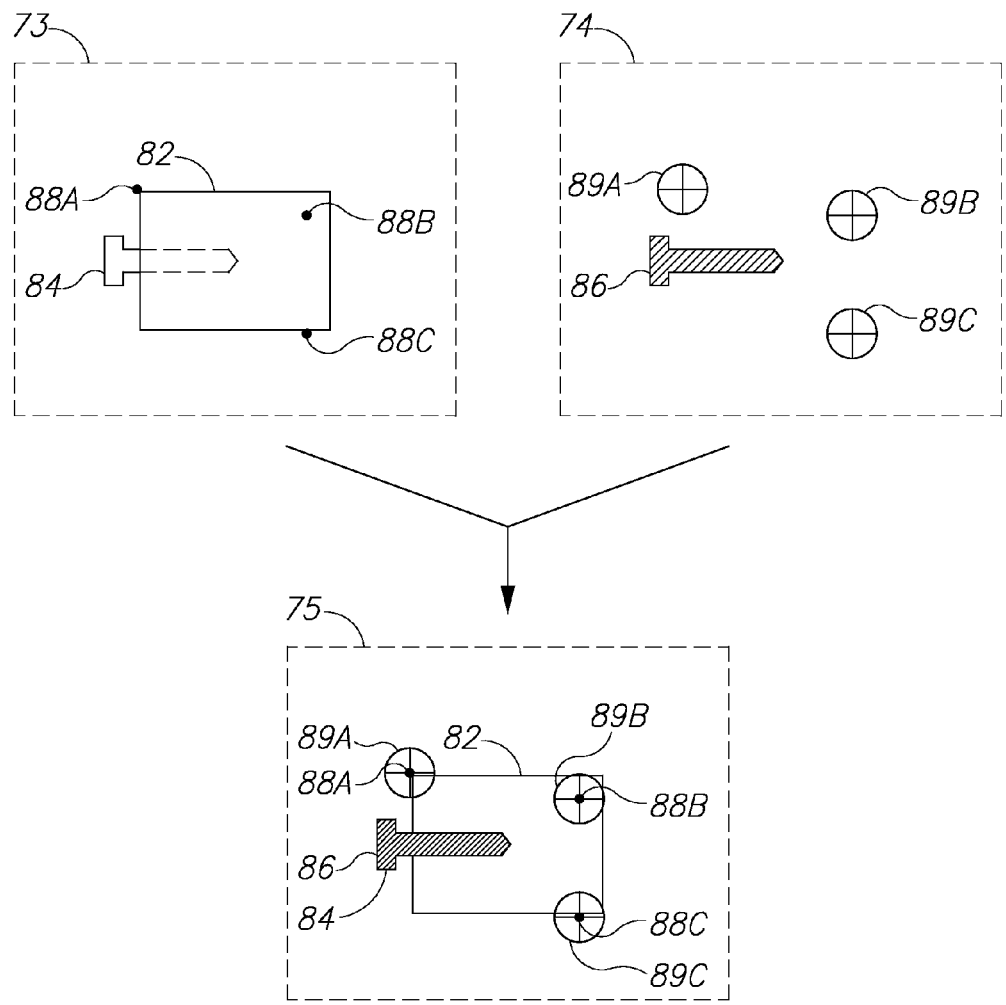
FIGS. 2A-2C schematically illustrates a scene image, an AVI and a RAR image that is a combination of the scene image and the AVI, in accordance with an embodiment of the invention.
Figure 2B:
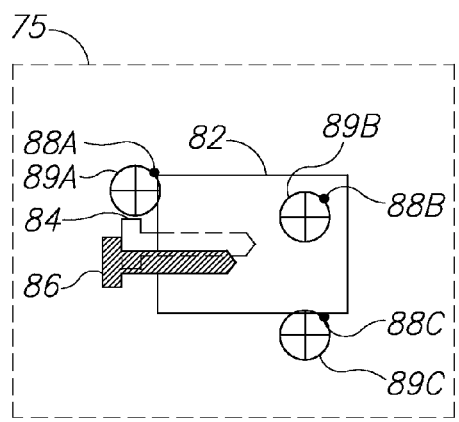

Reference is now made to FIG. 2A which schematically shows, by way of example, a scene image 73 of a possible scene 72 (of FIG. 1), AVI 74 rendered by RAR apparatus 100 (of FIG. 1), and a RAR image 75 (that may be PRAR 76 or CRAR 77 of FIG. 1), which is a combination of scene image 73 and AVI 74, in accordance with an embodiment of the invention.

In FIG. 2A, by way of example, scene image 73 comprises an object 84 partially embedded within an opaque substrate 82, so that only a portion of object 84 (shown with a continuous line) protruding from substrate 82 is visible in scene image 73. A remainder of object 84 (shown with a dashed line) that is inside substrate 82 is not visible in scene image 73. Further by way of example, substrate 82 has three features indicated by solid circles 88A-88C which may be suitable to function as fiducials.

AVI 74 comprises an AVI construct 86 which by way of example is a representation of object 84 in its entirety, showing the embedded portion of object 84 in addition to the visible portion of the object. AVI 74 further includes AVI markers 89A-89C that are homologous to fiducials 88A-88C.

RAR image 75, which is a combination of scene image 73 and AVI 74, comprise AVI construct 86 coincident with object 84, as well as fiducials 88A-88C coincident with AVI markers 89A-89C.

Object 84 and substrate 82 may be in any shape, and they may be in any spatial arrangement. The identity of the object and the substrate may be different depending on the particular application of the RAR apparatus. For example, substrate 82 may be a wood block, and object 84 may be a nail embedded within it. Alternatively, object 84 may be a plug that is placed inside an electronic device represented as substrate 82. Alternatively, object 84 may be an airplane that is entering a cloud represented by substrate 82. In a surgical setting, substrate 82 may be a bone segment of a patient and object 84 may be a setting pin. Alternatively, substrate 82 may be a portion of a patient and object 84 may be an organ, a blood vessel, a tissue, a tumor, a surgical instrument, or the like. There may be multiple substrates and multiple objects (which may or may not be embedded in a substrate), only substrates, only objects, only one substrate or only one object. Other examples of the identity of the object and the substrate in the context of various applications are described hereinbelow.

In certain embodiments of the invention, the AVI may be projected at a frame rate that allows changes in the AVI to be perceived by the person viewing the PRAR image to be a moving image. As such, the AVI may be projected from the projector at a frame rate of between about 15 frames per second (FPS) to about 100 FPS.

According to an embodiment of the invention, the AVI construct in the AVI may be rendered from a construct model stored in a computer memory of controller 140 (FIG. 1) of RAR apparatus 100, as a part of the AVI model.

According to an embodiment of the invention, the construct model may encode a two-dimensional representation or a three-dimensional representation of a corresponding object in the scene. In certain embodiments of the invention, the construct model may be based on a known shape and dimensions of the corresponding object. The construct model may, for example, be generated from drawings, CAD files, maps, and/or another previously prepared representation of the corresponding object. Alternatively, the construct model may be reconstructed from one or more images of an equivalent object having the same size and dimensions. In certain embodiments of the invention, the construct model may be reconstructed from one or more images of the same object that was captured previously, for example, before the object was placed in the scene (or embedded in the substrate). Alternatively, the construct model may be reconstructed from one or more images of the object captured before or during the viewing session with the RAR apparatus. In certain embodiments of the invention, the images may be optical images, or alternatively may be captured by means of an alternative non-optical imaging modality, such as but not limited to X-ray, magnetic resonance imaging (MRI), ultrasound or the like, that allows for capturing one or more images of a portion of the object or the object in its entirety (including, for example, any portions that may be embedded within the substrate). The imaging modality through which the construct model is reconstructed may be a tomographic imaging modality such as but not limited to a CT scan, a PET scan, a tomographic MRI, an ultrasound tomography or the like. In certain embodiments of the invention, the construct model may be periodically updated, with imaging sessions interspersed between, or performed concurrently with, viewing with the RAR apparatus. Periodically updating the construct model may be advantageous in cases where the shape or other features of the object changes over time, for example through manipulation of the object by a person.

Alternatively or additionally, the AVI construct may be an added visual content that is not a representation of physical features of a corresponding object or region in the scene, but provides information about the object or region. The visual content may be, for example, a piece of text such as a symbol, a name, a description, or a parameter (for example, distance from person, speed, location coordinates, or the like). Alternatively or in addition, the added visual content may be a graphic, for example an expected trajectory of the object, a planned placement or path of a non-existing object, a perimeter representing a safe distance from the object or region, a flashing circle highlighting the object/region or the like. Alternatively or in addition, the added visual content may be a video stream, for example from a camera in a minimally invasive surgery tool. Many other added types of visual content may occur to a person skilled in the relevant art.

Figure 2C:
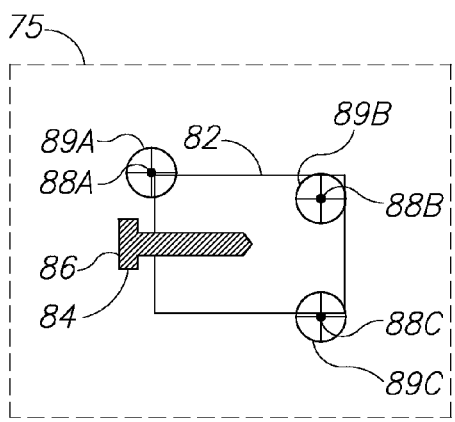

According to an embodiment of the invention, the AVI further includes a plurality of AVI markers. As shown in FIGS. 2A-2C, by way of example, AVI markers 89A-89C appear as targets, with the center of the fiducials 88A-88C located at the intersection of the target cross-hairs when the AVI markers and the homologous fiducials are coincident in RAR image 75. The AVI markers are typically computer generated, and may be presented as having any shape and/or color as specified, for example, as a red hollow circle, a yellow cross, or any other shape/color.

According to an embodiment of the invention, the AVI markers as presented in the AVI may be rendered from a marker model stored in the computer memory of the controller of the RAR apparatus as a part of the AVI model. The marker model encodes at least the locations of the fiducials. When the AVI is rendered from the AVI model, appropriate AVI markers are concomitantly rendered from the marker model as a part of the AVI. In certain embodiments of the invention, the marker model may be based on known locations of fiducials in a scene. The marker model may, for example, be generated from drawings, CAD files, maps, and/or another previously prepared representation of the scene. In certain embodiments of the invention, the marker model may be a reconstruction of the location of the fiducials based on one or more captured images of the scene. The captured images of the scene may optionally be optical images, or alternatively captured through an alternative imaging modality, such as but not limited to X-ray, MRI, ultrasound and the like. The imaging of the scene through which the marker model is reconstructed may be a three-dimensional tomographic (MRT) imaging such as but not limited to a CT scan, a PET scan, a tomographic MRI, an ultrasound tomography or the like. In certain embodiments of the invention, the imaging of the scene may be performed prior to viewing with the RAR apparatus. Alternatively, the marker model may be periodically updated with imaging sessions interspersed between, or performed concurrently with, viewings with the RAR apparatus. Periodically updating the marker model may be advantageous in cases where the locations of the fiducials relative to each other change over time due to, for example, movement or manipulation of the fiducials or the object.

In certain embodiments of the invention, the fiducials may optionally be native features naturally present in one or more items in the scene, or be artificial indicators applied to various locations in or around the scene. Artificial indicators may be advantageous in cases where the scene lacks native features that are sufficiently visible or distinct to serve as fiducials, for example for positional analysis with AVI markers or for the purpose of generating a marker model. The artificial indicators may be applied in any form as appropriate, for example, as a pin, a paint marking, a tattoo marking, an ink marking, a sticker, or the like. Further, the artificial indicators may include a high contrast material that has sufficient contrast or distinction to serve as fiducials. By way of example, artificial indicators for CT scanning may have materials that are highly opaque to X-ray, artificial indicators for MRI may have materials that are highly responsive to RF-induced magnetic resonance, and the like.

By way of example as shown in FIGS. 2A-2C, fiducials 88A-88C may be located on substrate 82. Alternatively or additionally, the fiducials may optionally be located on any feature, object or region in the scene.

According to an embodiment of the invention, as shown in FIG. 2A, the scene image comprises at least three fiducials 88A-88C. Typically, the fiducials are not all in one plane. More fiducials may be used for better accuracy. Alternatively, a curved line may be used as a fiducial having substantially the same utility as a plurality of points.

FIG. 2B shows a RAR image 75 after a shift in the scene and concomitant shift in scene image 73 and before the AVI is adjusted accordingly. By way of example as shown in FIG. 2B, substrate 82, together with object 84 is moved laterally to the right and upwards. Such a shift may be caused by a change in the position of the person, or by substrate 82 (with object 84) being moved. As a result of the shift, in RAR image 75, AVI markers 89A-89C are no longer coincident with the homologous fiducials 89A-89C and AVI construct 86 is no longer coincident with object 84. When such a shift occurs, the misalignment of AVI markers 89A-89C and homologous fiducials 88A-88C in RAR image 75 is detected by the RAR apparatus (in the case of RAR apparatus 100 shown in FIG. 1, by controller 140), which then renders an adjusted AVI 74. As shown in FIG. 2C, RAR image 75 with the adjusted AVI includes adjusted positions of AVI markers 89A-89C as well as a concomitantly adjusted position of AVI construct 86. As a result, the substantial coincidence of the AVI markers with the fiducials, and of the AVI construct with the corresponding object, is restored in RAR image 75. Similar adjustments of the AVI based on the positional comparison of the AVI markers with the fiducials in the RAR image may be made with different types of shifts in the scene, such as changes in the proximity of the object to the person or the orientation of the object in relation to the person (rotation).

In certain embodiments of the invention, adjustment of the AVI may be based on other factors in addition to the positional comparison of the AVI markers in the AVI with the fiducials in the scene image. Such additional factors may optionally include one or a combination of: an assumed position of the person relative to the object, data from external sensors configured to detect the position of the person's head, a user-provided estimated head position, or the like.

According to an embodiment of the invention, the adjustment of AVI 74 is a repeating process. That is, after a RAR image is analyzed to compare the alignment of the AVI markers with the homologous fiducials, an adjusted AVI is rendered based on the analysis and projected to the person. The resulting adjusted RAR image may then be analyzed to render a yet further adjusted AVI, and so on. This repeating process allows for the alignment between the scene image and the AVI to be continuously improved in an iterative process, in which the AVI is repeatedly adjusted until the degree of alignment between the AVI markers and the fiducials in the RAR image reach or go below a predefined threshold. Additionally or alternatively, the repeating process allows for the AVI to be continuously responsive to changes in the scene. In certain embodiments of the invention, the repeating process may include creating an updated construct model and/or an updated marker model.

It will be appreciated that the initial AVI at the beginning of a viewing session with the RAR apparatus is not rendered based on a positional comparison of AVI markers with the homologous fiducials in the RAR image because there are no AVI markers yet presented. The initial rendering of the AVI may, thus, be determined based on estimation methods that do not require comparing the positions of the AVI markers with the positions of the fiducials in the RAR image. The estimation methods may optionally be one or a combination of: an assumed position of the person and the object, data from external sensors configured to detect the position of the person's head, a user-provided estimated head position, or the like. Additionally or alternatively, the initial AVI may be determined based on an analysis of the positions of the fiducials in the initially captured scene image without comparison with AVI markers. In certain embodiments of the invention, the initial AVI may comprise the AVI markers without images of AVI constructs, and the AVI construct is presented following the adjusting of the AVI based on the positional comparison of the AVI markers with the homologous fiducials in the RAR image.

In certain embodiments of the invention, the AVI markers may be presented in a mode that is not visible to the person while being detectable by the camera. For the AVI to be adjusted by the controller based on the comparison of the fiducials and AVI markers, the AVI markers have to be detected by the camera, but do not have to be visible to the person. Therefore, the AVI markers may be projected, optionally, as a series of pulses having a duration that is too short to be perceived by a human, or at a wavelength that is detectable by the camera but is not visible to the human eye such as in the infrared wavelength range or the ultra-violet wavelength range. This may serve a number of uses, such as making the RAR image easier to interpret for the person viewing it, or aiding in the processing by the controller of the RAR image by making the AVI markers readily separable from the fiducials. In certain embodiments of the invention, the fiducials may be not visible to the person while being detectable by the camera, for example, infrared point sources that are at a wavelength that is detectable by the camera but not visible to the person.

With reference to FIGS. 3A-3C, in certain embodiments of the invention, the construct model may be a three-dimensional representation of an object in the scene, and the AVI construct may be a two-dimensional rendering from the construct model presenting the object as seen from a selected point of view. FIG. 3A shows a perspective view of a possible scene 172 having a substrate 182 with an embedded object 184, with illustrated arrows indicating point of view 1 ("POV1") and point of view 2 ("POV2"). By way of example, substrate 182 is shown with three features indicated by solid balls 188A-188C, which are suitable to function as fiducials.

FIG. 3B illustrates a scene image 173, an AVI 174 and a RAR image 175 based on the person viewing the scene 172 having substrate 182 and object 184 from POV1. In scene image 173, substrate 182 is visible together with fiducials 188A-188C, while object 184, being obscured by substrate 182, is not visible. AVI 174 includes AVI markers 189A-189C that are homologous to fiducials 188A-188C and an AVI construct 186, which is a two-dimensional image representing object 184 as seen from POV1 that is rendered from a construct model that is a three-dimensional representation of object 184. AVI construct 186, presented to be coincident with the correct location of non-visible object 184 in RAR image 175, appears as a circle, corresponding to the orientation of object 184 with respect to POV1.

FIG. 3C illustrates scene image 173, AVI 174 and RAR image 175 based on the person viewing scene 172 having substrate 182 and object 184 from POV2. In contrast to scene image 173 in FIG. 3B, the protruding portion of object 184 is visible, reflecting the rotation of substrate 182 in the shift from POV1 to POV2. Further reflecting the rotation of substrate 182, the positions of the fiducials 188A-188C in scene image 173 are shifted. For example, while fiducial 188A is to the left of fiducial 188B in scene image 173 of FIG. 3B, the fiducial 188A is to the right of fiducial 188B in scene image 173 of FIG. 3C. As shown in RAR image 175, AVI 174 is adjusted so that the AVI markers 189A-189C remain substantially coincident with shifted fiducials 188A-188C, and AVI construct 186 is concomitantly adjusted to appear as a long tubular object, corresponding to the orientation of object 184 with respect to POV2. The adjustment of AVI 174, including the orientation of AVI construct 186 and the positions of AVI markers 189A-189C, may be based on comparing the positions of AVI markers 189A-189C with homologous fiducials 188A-188C in the scene image, as the scene image shifts from POV1 to POV2, as described hereinabove with reference to FIGS. 2A-2C.

In accordance with an embodiment of the invention, adjustments made in the AVI construct according to the POV as described above may also be utilized to produce a stereoscopic perception of an AVI construct. Two RAR apparatuses may be incorporated into a binocular system, each RAR apparatus associated with one of the two eyes of the person so that separate AVIs may be projected to the two eyes. The difference in position of the two eyes creates a difference in the positions of the fiducials in the scene image, which results in differences in the AVI construct presented to each eye, generating a stereoscopic perception in the person's mind.

Reference is now made to FIG. 4A, which schematically shows a "split-field RAR apparatus" 200 that is substantially the same as RAR apparatus 100, with the addition of an occluder 205 that is operable to block a portion of the scene light from the scene to create a darkened "occluded field" in the scene image. The occluder is typically mounted further away from the eye of the person compared to optics 110 that directs the AVI to the person or the camera, so that the occluder blocks only the scene light.

Reference is now made to FIG. 4B, which schematically shows a "split-field RAR image" 93 that is substantially the same as RAR image 75 of FIG. 2A, with the addition of an occluded field 94 and an AVI construct 96, also referred to as a "replacement AVI construct", which overlays the occluded field or a portion thereof. By way of example, as shown in FIG. 4B, replacement AVI construct 96 may be a text field describing an object shown in the RAR image. Alternatively, replacement AVI construct 96 may be a video stream. In a surgical application, the video stream may, by way of example, be from a camera that is a part of a minimally invasive surgery tool. Alternatively, replacement AVI construct 96 may be an image or a video stream of the scene from a different POV or a different scene. The split-field RAR image may include multiple replacement constructs. Because the scene light is blocked in the occluded field, the replacement AVI construct may be viewed by the person without interference from the scene image. In certain embodiments of the invention, AVI makers may be excluded from the portion of the AVI overlaying occluded field 94, to match the lack of fiducials in occluded field 94.

The size and location of the occluded field may be adjustable. Various methods and components for adjusting the size and location of the occluded field are known in the art. By way of example, the occluder may include a movable screen, with the location and size of the movable screen within the path of the scene light determining the location and size of the occluded field. The size of the movable screen may be adjustable, or the screen may be replaceable so that a screen of the desired size may be attached to the occluder.

Reference is now made to FIG. 5, showing an illustration of a particular example of a scene 372, a scene image 373, an AVI 374, and a RAR image 375, in a surgical setting, in accordance with an embodiment of the invention. In this example, scene 372 is a scene of a surgical site in which an opening 362 has been made in the lower torso of a patient 360, which partially reveals a top portion of a kidney 364. Scene image 373 may be the surgical site as seen by a surgeon (not shown in FIG. 5). AVI 374 includes an image of an AVI construct 386 that is a representation of kidney 364. In RAR image 375, AVI construct 386 is coincident with the location and orientation of kidney 364 in scene image 372 such that the surgeon is able to view "through" the patient to see construct 386 together with the surrounding portions of patient 360. The AVI may include other AVI constructs corresponding to other objects such as surgery tools, including implants, catheters, clamps, pads, and the like, which may be visible or obscured in the scene. In certain embodiments of the invention, the object may not be visible at all to the surgeon, for example, when the object is situated in a location that is not exposed by the incision, or when the incision is small, for example in an endoscopic procedure. By way of example, the object may be a pin to be inserted into a vertebra, and the surgeon inserts the pin via a small incision without exposing the bone. In such an example, the vertebra itself as well as the pin may be represented in the AVI model and be part of one or more AVI constructs. Additionally or alternatively, a vector indicating the direction from which the pin should be inserted and optionally a vector indicating the direction of the pin insertion tool may be part of the AVI model and AVI construct(s).

In the following detailed description, with reference to FIGS. 6A-6B and 7A-7C, examples of a RAR apparatus in accordance with an embodiment of the invention, with exemplary optics having one or more mirrors for directing scene light from a scene and AVI light projected from a projector, are discussed. The exemplary optics may include additional optical elements, such as lenses, prisms or additional mirrors as needed, and/or to provide additional functionalities of the optics, such as magnification and the like. The mirrors in the optics may be made of transparent glass, plastic sheet, or other materials known in the art, and may have one or more optical coatings, as known in the art, to provide desired optical transmission and reflection properties. The mirrors may have various shapes and configurations, as known in the art. By way of example, the mirrors may be thin or thick, large or small, or a surface of a beam splitting cube. Particular depiction of the mirrors in FIGS. 6A-6B and 7A-7C is a schematic drawing that does not exclude any particular embodiment of the invention. The mirrors of the optics, as described with reference to FIGS. 6A-6B and 7A-7C include any devices, elements, or combinations of elements, having a variety of shapes that may be used in the art as a mirror.

Figure 6A:
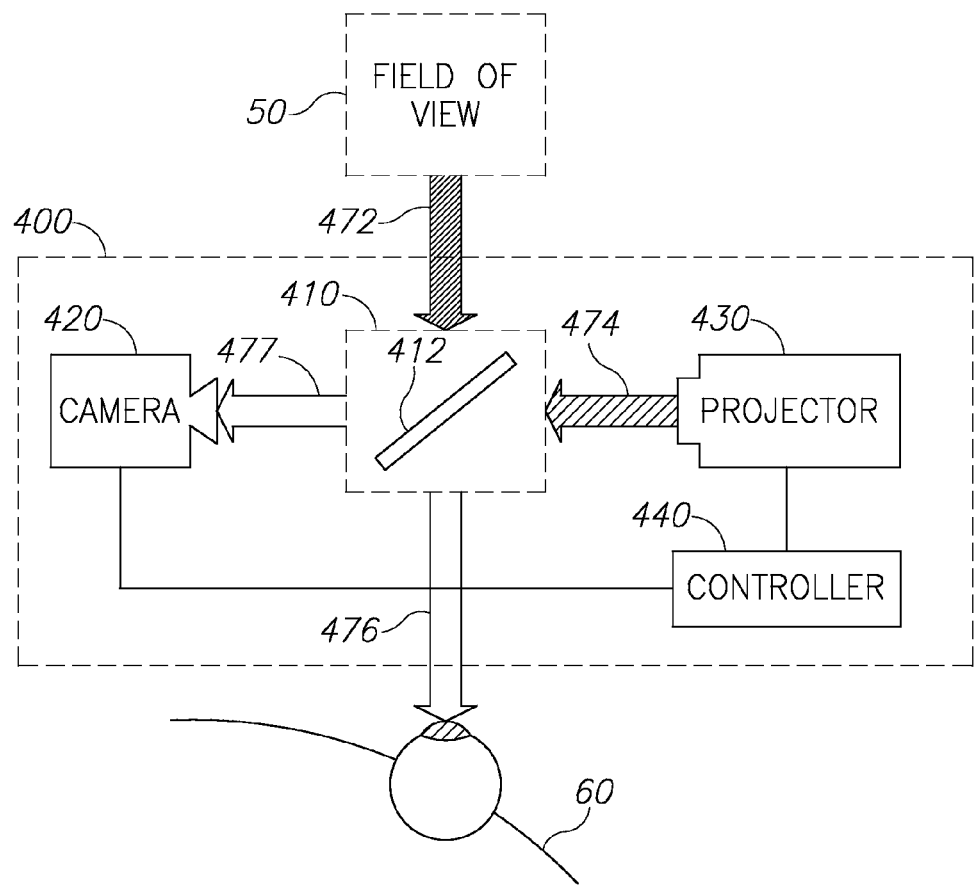
FIGS. 6A-6B schematically illustrates a RAR apparatus and optical paths taken by light from various visual inputs in the optics of the RAR apparatus, in accordance with an embodiment of the invention.

Reference is now made to FIG. 6A showing a schematic top view of a RAR apparatus 400 comprising optics 410, a camera 420, a projector 430 and a controller 440, in accordance with an embodiment of the invention. Scene light arriving from a scene is schematically represented by a block arrow 472. Controller 440 renders an AVI (not shown) in projector 430. Projector 430 projects AVI light, which is schematically represented by a block arrow 474. Optics 410, comprising a mirror 412, receives scene light 472 and AVI light 474 and directs a portion of AVI light 474 and a portion of scene light 472 to person's 60 eye to generate a PRAR image (not shown) on the person's retina. PRAR light comprising the portion of AVI light 474 and the portion of scene light 472 directed by optics 410 to person's 60 eye is schematically represented by a block arrow labeled 476. Additionally, optics 410 directs a portion of AVI light 474 and a portion of scene light 472 to camera 420 to generate a CRAR image (not shown) on the camera's photosensor (not shown). CRAR light comprising portions of AVI light 474 and scene light 472 directed by optics 410 to the camera is schematically represented by a block arrow labeled 477. In certain embodiments of the invention, as shown in FIG. 6A, mirror 412 is situated between the scene and the person and also between the projector and the camera. It will be appreciated that the various elements of RAR apparatus 400 may be situated in various configurations, and the drawings are not intended to limit the physical arrangement of the elements, For example, the locations of projector 430 and camera 410 may be reversed so that projector is on the left side of the eye and the camera is on the right side. Alternatively, the projector may be above the eye and the camera may be below the eye. Uses of additional optical elements to accommodate particular physical arrangements of elements are known in the art.

According to an embodiment of the invention, mirror 412 may be partially reflecting and partially transmitting. Mirror 412 may have one surface that is coated with an anti-reflective coating to be mostly non-reflective, with the other side being coated as desired with layers of materials to be partially reflecting and partially transmitting, as known in the art. In the discussion below the non-reflective surface will be neglected as it does not influence the optical performance of optics 410. Alternatively, mirror 412 may be a thin sheet of material, where the reflections from both surfaces have negligible lateral shift. Alternatively, mirror 412 may be a beam splitting cube, with the optical coating of interest embedded inside the cube and the other optical surfaces of the cube are coated with anti-reflective coatings. Mirror 412 by way of example may have a reflection/transmission ("R/T") ratio of about 50%/50%. Additionally, R/T ratio may be wide-band, being substantially the same across the range of relevant wavelengths, for example in the visible range or from infrared to ultraviolet wavelengths.

In an alternative embodiment of the invention, partially reflecting mirror 412 may comprise a controlled mirror that can change its reflection and transmission properties over time. Such a mirror, by way of example, may be a liquid crystal, electro-optics or magneto-optics cell. Such a mirror may be configured to, in alternating intervals, have more or less transmission or reflection to scene light 472 and AVI light 474 projected by projector 430. When the controlled mirror is adjusted to be mostly transparent, substantially all of scene light 472 is transmitted to the person and substantially all of the AVI light 474 is transmitted to the camera. When the controlled mirror is adjusted to be mostly reflective, substantially all of scene light 472 is reflected to the camera and substantially all of the AVI light 474 is transmitted to the person. As such, each of PRAR 476 and CRAR 477 comprises pulses of scene light 472 alternating with pulses of AVI light 474. The R/T ratio in such a configuration may be determined by the proportion of the time the controlled mirror is reflective compared to the time the controlled mirror is transmissive.

In an alternative embodiment of the invention, partially reflecting mirror 412 may comprise a mirror that has different reflection properties on different areas of its surface. For example, mirror 412 may have be mostly transmissive on a first area of its surface and be mostly reflective on a second area of its surface. The first and second areas may be placed into the optical path of scene light 472 and AVI light 474 in an alternating fashion over time. Such an alternating placement may be achieved, for example, with a rotating mirror having the first and second areas.

Figure 6B:
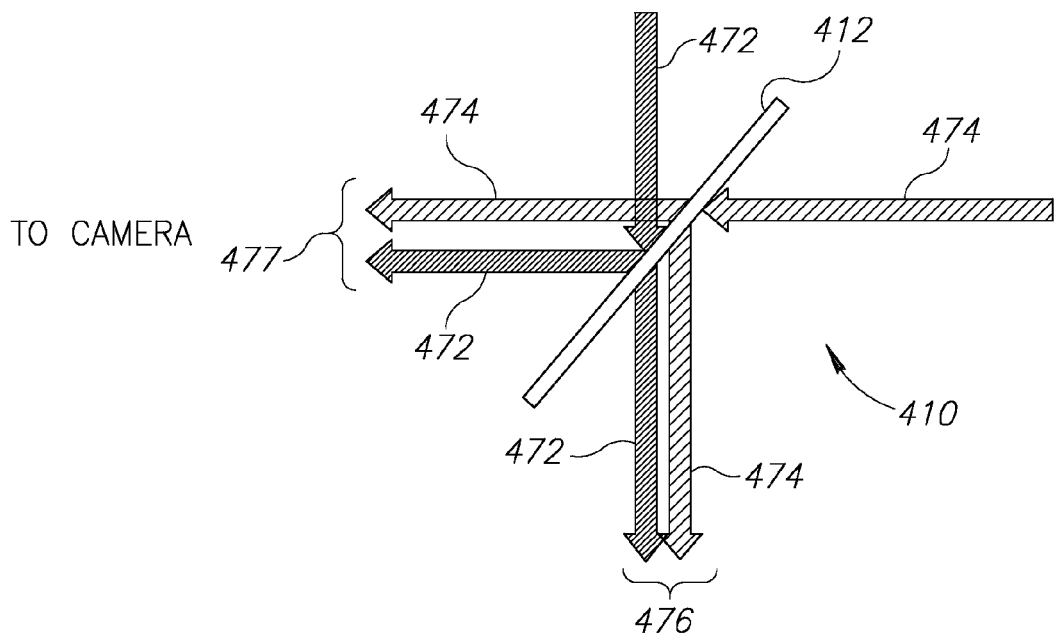

FIG. 6B illustrates directing scene light 472 and AVI light 474 by optics 410 having mirror 412. Optics 410 generates PRAR light 476 and CRAR light 477 simultaneously. Scene light 472 is split by mirror 412, being partially directed to the camera via reflection and partially directed to the person via transmission. AVI light 474 is also split by mirror 412, being partially directed to the person via reflection and partially directed to the camera via transmission. Thus, CRAR light 477 includes the portion of AVI light 474 transmitted through mirror 412 and the portion of scene light 472 reflected by mirror 412, and PRAR light 476 includes the portion of scene light 472 transmitted through mirror 412 and the portion of AVI light 474 reflected by mirror 412.

In certain embodiments of the invention, the distance between mirror 412 and the eye of the person may be substantially the same as the distance between mirror 412 and camera 420. RAR apparatus 400 may be configured such that the front nodal point of the lens of camera 420, as reflected by the mirror 412, coincides with the front nodal point of the lens in the eye of the person, as transmitted through the mirror 412. Such arrangements of the camera and the optics in relation to the person's eye may be advantageous, for example, by preventing or minimizing parallax error between the CRAR image and the PRAR image. In certain embodiments of the invention, mirror 410 may be optically flat, having no optical power. An optically flat mirror 410 may be advantageous, for example, by preventing or minimizing magnification differences between the scene image and the AVI in the CRAR image and the PRAR image. In certain embodiments of the invention, optics 410 may have several optical elements having an integrative effect of a flat mirror.

In accordance with an embodiment of the invention, the RAR apparatus may be configured so that the relative level of luminance between the scene light and the AVI light is substantially the same in the CRAR light and the PRAR light.

In certain embodiments of the invention, the R/T ratio of mirror 412 may be about 50%/50%, resulting in the relative brightness of scene light 472 and AVI light 474, as captured by camera 420 and as observed by the person, being substantially the same. If the R/T ratio departs from 50%/50%, the relative brightness of a scene light 472 compared to AVI light 474 will be different in PRAR light 467 and CRAR light 477 (absent any additional adjustments). In such a case, various luminance equalization methods may be employed to ensure that the relative brightness between the scene light 472 and the AVI light 474 is substantially the same in both PRAR light 476 and CRAR light 477. All mirrors have some optical loss, and the sum of the reflected light and the transmitted light is not 100%. However, this optical loss is typically small and will be neglected here for clarity of discussion. The optical loss may be calculated by a person skilled in the art.

Assume by way of example that mirror 412 has a wide-band R/T ratio that is low reflection/high transmission, as may be advantageous in enabling the person to perceive the scene in nearly the natural level of illumination. A first luminance equalization configuration may be employed, where AVI light 474 is monochromatic, projected substantially at a single wavelength or as a combination of discrete monochromatic wavelengths, and mirror 412 comprises one or more optical coatings tuned to enhance reflection for each of the one or more monochromatic wavelengths at which AVI light 474 is projected, so that an R/T ratio, hereinafter referred to as a "monochromatic R/T ratio", with respect to each of said monochromatic wavelengths is substantially an inverse of the wide-band R/T ratio.

By way of example, mirror 412 may have a wide-band R/T ratio of 20%/80%, with an optical coating tuned to a monochromatic wavelength at which projector 430 projects AVI light 474, such that the R/T ratio for that monochromatic wavelength is 80%/20%. Given such optics 410, scene light 472 is directed to the person at 80% of its original luminance via transmission (based on the wide-band R/T ratio) and AVI light 474 is directed to the person at 80% of its original luminance via reflection (based on the monochromatic R/T ratio). At the same time, scene light 472 is directed to the camera at 20% of its original luminance via reflection (based on the wide-band R/T ratio) and AVI light 474 is directed to the camera at 20% of its original luminance via reflection (based on the monochromatic R/T ratio). As such, while the overall luminance of PRAR light 476 is four times the overall luminance of CRAR light 477 (80% directed to the person vs. 20% directed to the camera), the relative luminance between AVI light 474 and scene light 472 in each of the RAR lights is substantially the same.

Projector 430 projecting AVI light 474 at three monochromatic wavelengths may be advantageous, as it would allow for generating the AVI image in full color, for example, by using a combination of red-green-blue or other additive primary colors. In accordance with the three monochromatic wavelengths being projected from projector 430, mirror 412 may comprise optical coatings to provide the monochromatic R/T ratio for each of the three monochromatic wavelengths.

Alternatively or additionally to the first luminance equalization method, a second luminance equalization method may be employed, in which projector 430 projects AVI light 474 in a pulsed mode.

Assuming by way of example a mirror 412 having a low R/T ratio, AVI light 474 is attenuated more than scene light 472 in PRAR light 476 because AVI light 474 is directed to the person via reflection while scene light 472 is directed to the person via transmission. This luminance mismatch in PRAR light 476 may be corrected by increasing the luminance at which the projector 430 projects AVI light 474. However, correcting the luminance mismatch in PRAR light 476 in such a way exacerbates the luminance mismatch in CRAR light 477. In CRAR light 477, due to the same low reflection/high transmission property of mirror 412, it is scene light 472 that is more attenuated than AVI light 474. As a result, when the luminance mismatch in PRAR light 476 is corrected by increasing the luminance at which projector 430 projects AVI light 474, an even greater luminance mismatch between AVI light 474 and scene light 472 is introduced to CRAR light 477, with the AVI light being much brighter than the scene light.

This exacerbated luminance mismatch in CRAR light 477 may then be corrected separately as follows. Projector 430 may be configured to project AVI light 474 in pulse mode, and the light capturing properties of the camera is controlled to change over time. Because AVI light 474 is pulsed from projector 430 while scene light 472 is presented continuously, the RAR light has periods of time when scene light 472 is presented together with AVI light 474, and other periods of time when scene light 472 is presented without AVI light 474. Thus, the degree to which AVI light 474 is captured by camera 420 may be tuned independently from the degree to which scene light 472 is captured by camera 420. That is, scene light 472 (which, in CRAR light 477, is much dimmer than AVI light 474) can be preferentially captured by making camera 420 more receptive during the phases when scene light 472 is being presented in isolation, and making camera 420 less receptive during the phases when scene light 472 is presented together with AVI light 474.

As a numerical example of the differential capturing of scene light 472 and AVI light 474 by camera 420, assume by way of example that camera 420 runs at 100 frames per second ("FPS"), that is, 1 frame per 10 milliseconds (msec). Further assume by way of example that projector 430 is operated in a pulsed mode such that AVI light 474 is pulsed at 25 FPS (which is equivalent to 1 pulse per 40 msec) with a duty cycle of 25%. Thus, AVI light 474 is projected by the projector at intervals of 10 msec that are interspersed by 30 msec rest periods where the AVI light is not projected. Further, the 25 FPS frame rate of projector 430 and the 100 FPS frame rate of camera 420 is synchronized so that each 10 msec pulse of AVI light 474 coincides with every fourth 10 msec frame captured by camera 420 (referred to herein as a "coinciding frame").

Assume that mirror 412 has an R/T ratio of 20%/80%. Assume that the average luminance of scene light 472 is 100 units (arbitrary), and projector 430 projects AVI light 474 at an average luminance of 400 units, which is 4× higher than that average luminance of the scene light. Given this configuration, in PRAR light 476 directed to the person, scene light 472 is transmitted through mirror 412 at 80 units (or 80% of its original average luminance of 100 units), and AVI light 474 is reflected by mirror 412 at the matching luminance of 80 units (or 20% of its original average luminance of 400 units). However, the respective luminance of scene light 472 compared to AVI light 474 is skewed in favor of AVI light 474 in CRAR light 477, in which scene light 472 is reflected by mirror 412 at 20 units (or 20% of its original average luminance of 100 units), and AVI light 474 is transmitted through mirror 412 at 320 units (or 80% of its original average luminance of 400 units). Thus, in CRAR light 477, the average luminance of AVI light 474 is about 16 times greater than the average luminance of scene light 472. Further, due to AVI light 474 being projected only during one of out of every four frames captured by camera 420, the luminance at which AVI light 474 is projected during each coinciding frame, as opposed to the average luminance, is 1600 units (400 units× 4). As such, the luminance of AVI light 474 during each coinciding frame is 1280 units (80% of 1600 units), and the luminance AVI light during the coinciding frame is 64 times greater than the luminance of scene light 472. To match the average luminance of AVI 474 to the average luminance of scene light 472, the signal captured by camera 420 from AVI light 474 is advantageously appropriately attenuated.

The electrical signal output of camera 420 from AVI light 474 may be preferentially attenuated by selectively reducing the electrical signal output of camera 420 during the coinciding frames. The electrical signal output of camera 420 from AVI light 474 may be attenuated by various methods such as electrical attenuation, shortening integration times of the photo-activated cells of camera 420, computationally reducing the detected signal by an adjustment factor, inserting an electro-optical or magneto-optical attenuator in the light path, or changing the reflection properties of mirror 412 over time.

The pulsed presentation of the AVI light, together with the induced mismatch in luminance between the AVI light and the scene light in the second luminance equalization method may also be useful for the controller to distinguish between the scene image and the AVI, for example to distinguish between the image of the fiducials and the homologous AVI markers.

Additionally, differential capturing of the scene light and the AVI light by the camera may be advantageous, by allowing additional persons viewing the output of camera 420 on a display device (not shown) outside of the RAR apparatus to control the brightness of the AVI compared to the scene image as seen on the display device without interfering with the operation of the RAR apparatus.

In the above first and second luminance equalization methods, the luminance of AVI light 474 was equal to the luminance of scene light 472 in PRAR light 476. In certain embodiments of the invention, AVI light 474 may be higher or lower in luminance compared to scene light 472 in PRAR light 476, which may be achieved by adjusting the luminance of AVI light 474 projected by projector 430 accordingly.

Figure 7A:
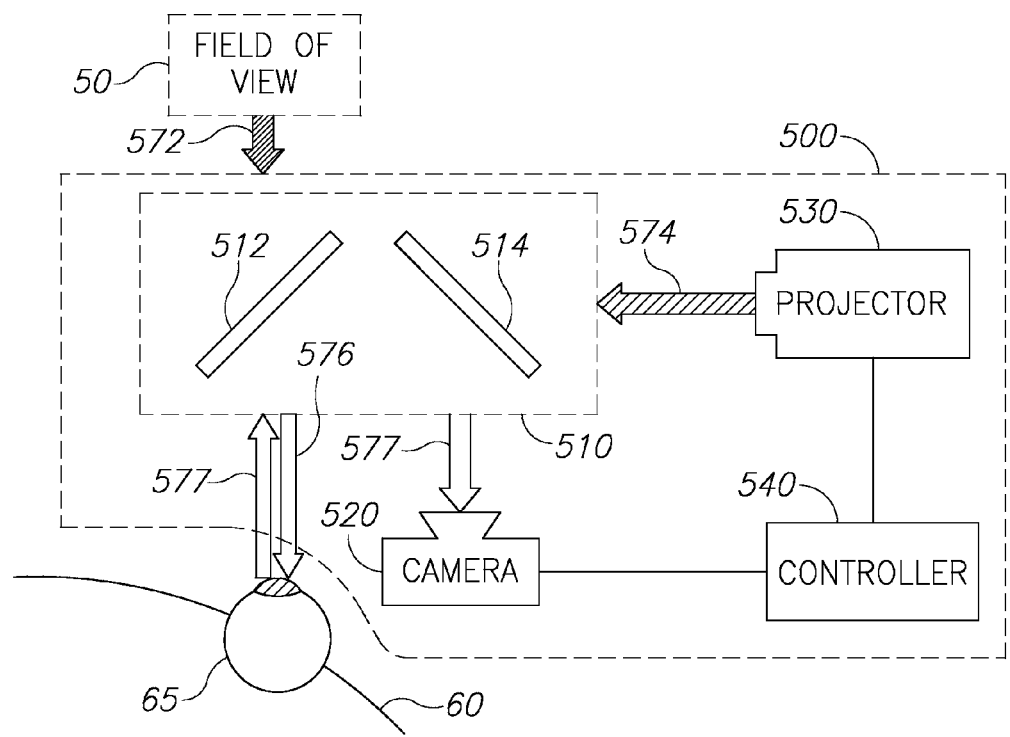
FIGS. 7A-7C schematically illustrates another RAR apparatus and optical paths taken by light from various visual inputs in the optics of the RAR apparatus, in accordance with an embodiment of the invention.
Figure 8A:
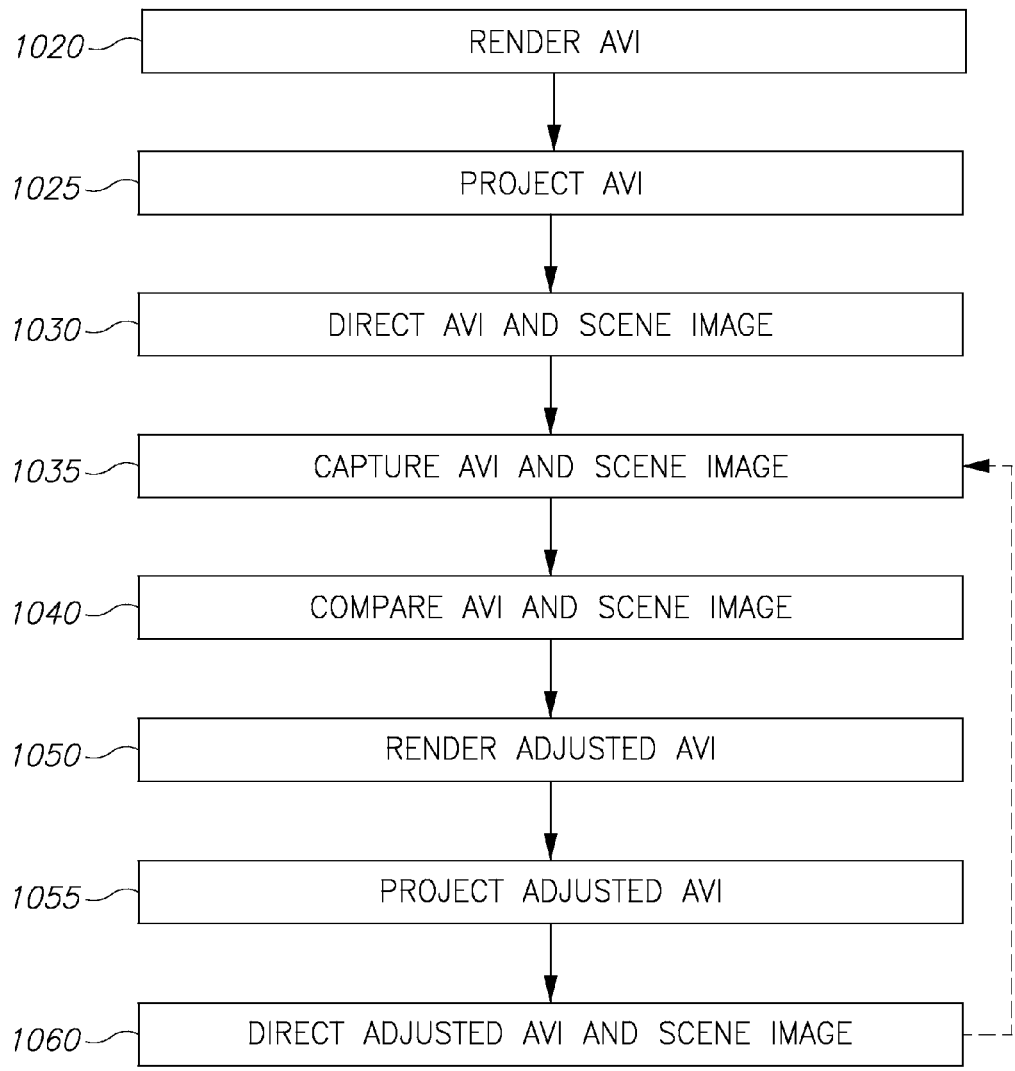
FIGS. 8A-8B shows flowcharts for a method for providing a person with an AR responsive to a scene that the person views, in accordance with an embodiment of the invention.
Figure 8B:
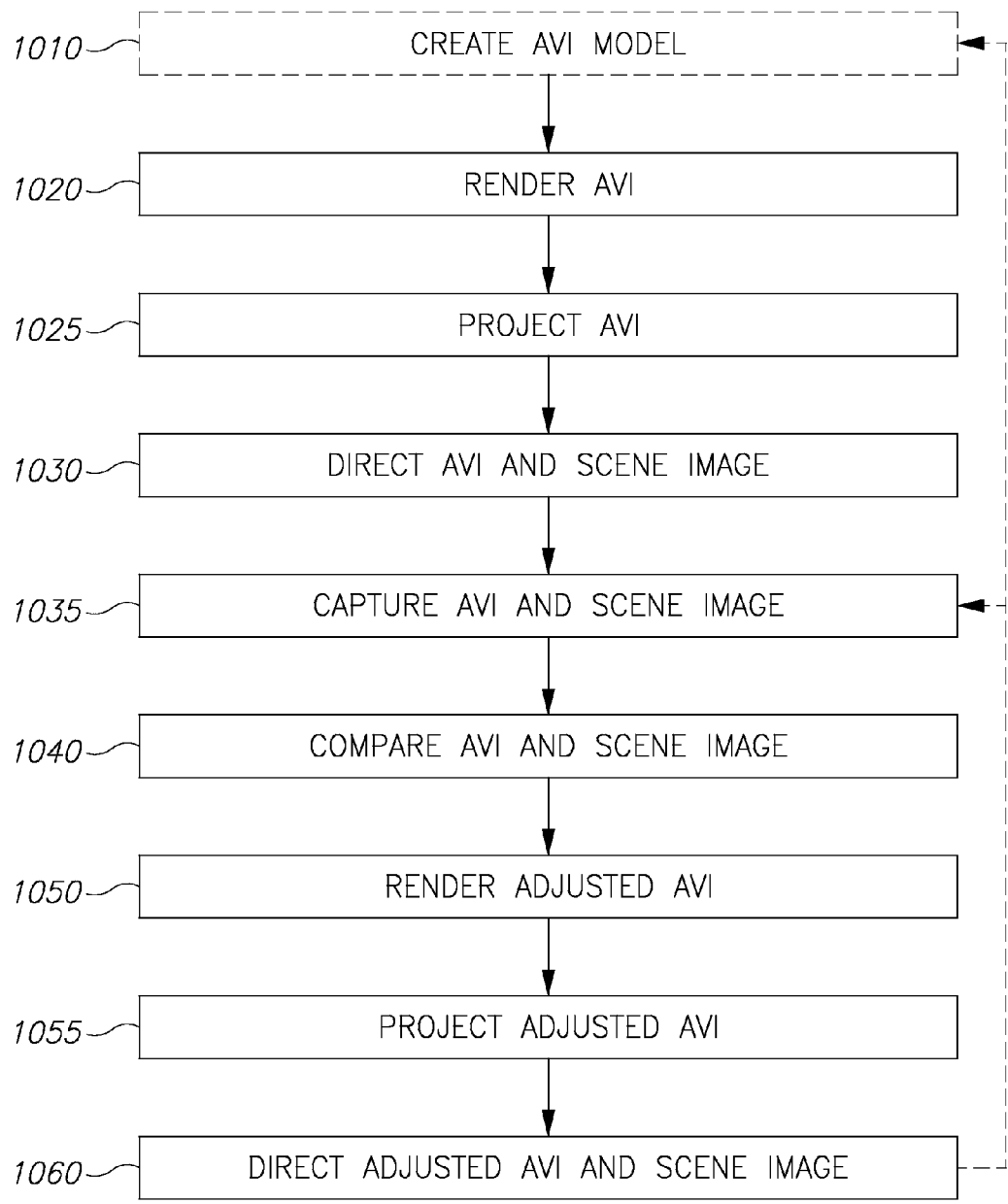

Reference is now made to FIG. 7A, showing a schematic top view of a RAR apparatus 500, in accordance with an embodiment of the invention. Scene light arriving from a scene that a person is looking at is schematically represented by a block arrow 572. RAR apparatus 500 comprises optics 510, camera 520, projector 530 and controller 540. Controller 540 renders an AVI (not shown) in projector 530. Projector 530 projects AVI light, schematically represented by a block arrow 574. Optics 510 directs a portion of AVI light 574 and a portion of scene light 572 to eye 65 to generate a PRAR image (not shown) on the retina of eye 65. The PRAR light is schematically represented by a block arrow 576. CRAR light, which includes portions of AVI light 574 and scene light 572 directed by optics 510 to the camera to generate a CRAR image (not shown) on a photosensor (not shown) of camera 520, is schematically represented by a block arrow labeled 577. It will be appreciated that the various elements of RAR apparatus 500 may be spatially configured in various configurations, and the drawing of FIG. 7A is not intended to limit the physical arrangement of the elements. The use of additional optical elements to accommodate particular physical arrangements of elements is known in the art.

Optics 510 is configured to direct the RAR light to the person and camera 520 in a serial manner, first directing PRAR light 576 to eye 65, then receiving a reflection of PRAR light 576 from the retina of eye 65 and directing the reflection to camera 520 as CRAR light 577.

Figure 7B:
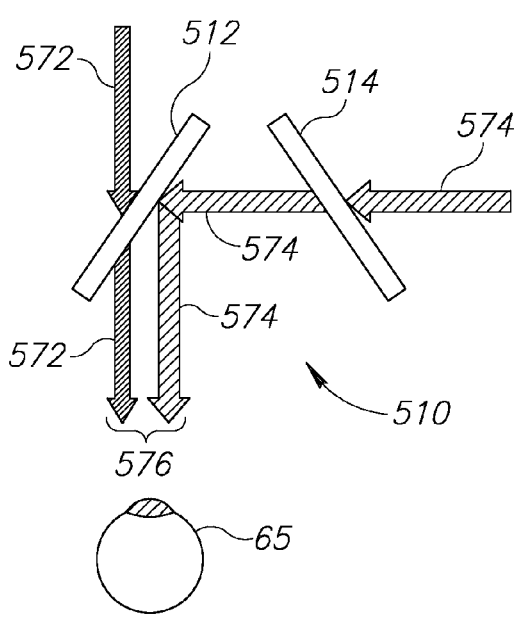
Figure 7C:
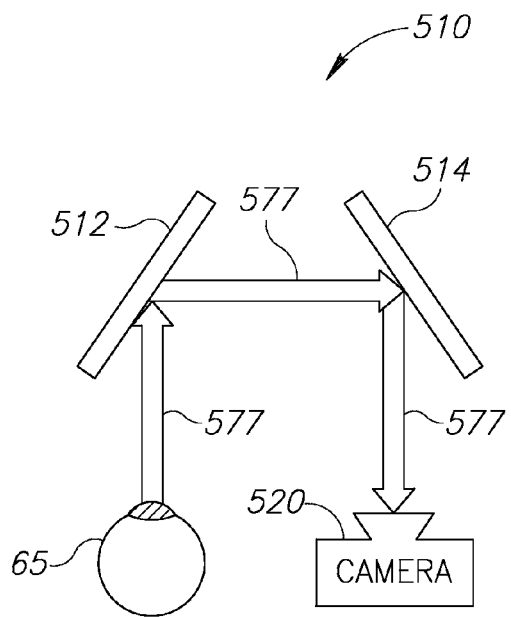

FIGS. 7B-7C illustrate the paths of the light of the various visual inputs through optics 510. First mirror 512 and second mirror 514 are partially transmitting and partially reflecting mirrors. Reference is now made to FIG. 7B, which shows the paths of scene light 572 and AVI light 574 through optics 510 to form PRAR light 576. For simplicity of presentation, some reflections and transmissions created in the optics that are not utilized are not shown. Scene light 572 is transmitted through mirror 512 towards eye 65. AVI light 574 is transmitted through mirror 514 and reflected by mirror 512 towards eye 65. The resulting combination of scene light 572 and AVI light 574 directed to eye 65 forms PRAR light 576. Reference is now made to FIG. 7C, which shows the path of CRAR light 577 through optics 510. CRAR light 577 is a reflection of PRAR light 576 from the retina of eye 65, which is reflected by mirror 512 and mirror 514 to be directed to camera 520. Because camera 520 is configured to capture light reflecting from eye 65, the controller may further be operable to determine the direction of gaze of the person by tracking the location of one or more features of the eye, by way of example, by tracking the location of the fovea.

In certain embodiments of the invention, optics 410 (as described with reference to FIG. 6A) and optics 510 (as described with reference to FIG. 7A) may be combined into one RAR apparatus (not shown), so that the benefit of the respective optics may be used as needed for a specific application.

According to an embodiment of the invention, a RAR apparatus of an embodiment of the invention may be incorporated in a head-mounted display or a helmet-mounted display, or be worn like a pair of glasses. In certain embodiments of the invention, the RAR apparatus may incorporate additional optical elements to, for example, create magnification or reduction in the scene viewed by the person or fold the optical path in a desired way. Alternatively, the RAR apparatus may be incorporated in an optical instrument that provides magnification or reduction of the scene viewed by the person, including but not limited to a microscope, a telescope, a binocular, or a pair of glasses. The RAR apparatus may be integrated within another device or system, or may be retrofittable.

In certain embodiments of the invention, the RAR apparatus may be incorporated into a monocular system. Alternatively, two RAR apparatuses may be incorporated into a binocular system. In the binocular system, the two RAR apparatuses may independently project AVI light to each eye to generate the respective AVIs. Because the positions of the fiducials is slightly different in the respective scene image of each eye, each of the two RAR apparatuses renders a different AVI construct that is projected to each eye to generate a stereoscopic perception in the person's mind. In certain embodiments of the invention, one controller may be utilized for the two RAR apparatuses, rendering two AVIs having different AVI constructs for projection by the two projectors.

Reference is now made to FIG. 8A, which is a flowchart of a method for providing a person with an AR responsive to a scene that the person views, the method comprising: rendering an AVI that has AVI markers homologous to fiducials in the scene (1020); projecting the AVI (1025); directing the AVI and an image of the scene to the person's eye and a camera (1030); capturing the AVI and the image of the scene (1035); comparing positions of AVI markers in the captured AVI with positions of homologous fiducials in the captured scene image (1040); rendering an adjusted AVI in which the AVI markers are substantially coincident with the homologous fiducials in the captured scene image (1050); projecting the adjusted AVI (1055); and directing the adjusted AVI and the image of the scene to the person's eye and the camera. (1060).

In certain embodiments of the invention, the method may be a repeating process. Thus, following the completion of block 1060, where the adjusted AVI and scene image are directed to the person's eye and camera, the method may repeat from block 1035, to capture the (adjusted) AVI and the scene image. Each repeated cycle of the method may be referred to as a "viewing cycle". The viewing cycles may continue for a "session" of multiple viewing cycles for a predetermined time or until stopped by the person's command. This repeating process may allow for the alignment between the scene image and the AVI to be continuously improved in an iterative process, in which the AVI is repeatedly adjusted until the degree of alignment between the AVI markers and the images of the fiducials reach or go below a predefined threshold. Additionally or alternatively, the repeating process may allow for the AVI to be continuously responsive to changes in the scene image, which may be caused by changes in the person's head location or the movement of objects in the scene.

According to an embodiment of the invention, the AVI rendered in block 1020 may be an initial AVI. In certain embodiments of the invention, the initial AVI may be rendered based on one or more estimation methods that do not require comparing the positions of the AVI markers with the fiducials in the scene. The one or more estimation methods may optionally be based on one or a combination of: an assumed position of the person and the object, data from external sensors configured to detect the position of the person's head, a user-provided estimated head position, or the like. Alternatively or in addition, the initial AVI may be rendered based on the positions of the fiducials in an initially captured scene image. In certain embodiments of the invention, the initial AVI may comprise only the AVI markers, so that the AVI construct is first presented in the adjusted AVI based on the positional comparison of the initial AVI markers with the image of the homologous fiducials.

With reference to FIG. 8B, in certain embodiments of the invention, the method may be preceded by the creating of a new AVI model, which may include creating a new construct model and/or a new marker model (1010), where the AVI rendered in block 1020 is based on the new AVI model created in block 1010. The new AVI model may be a reconstruction from one or more images captured from the scene. The images may be captured through optical imaging, or imaging by means of an alternative imaging modality, such as but not limited to X-ray, MRI, ultrasound and the like. The imaging may be a tomographic imaging, such as but not limited to a CT scan, a PET scan, a tomographic MRI, an ultrasound tomography or the like. Where the scene and the objects within it are unstable or subject to movement and change, it may be advantageous to precede at least a portion of the viewing cycles with creating a new construct model and/or marker model.

In a repeating process, after directing the adjusted AVI and the scene image to the person's eye and camera (1060), the method may engage block 1035 to capture the (adjusted) AVI and the scene image or, alternatively, the method may engage block 1010 to create a new construct model and/or a new construct model. The method may engage block 1010 instead of block 1035 in every viewing cycle or in a subset of the viewing cycles, for example, every ten viewing cycles, every other viewing cycle or the like. Alternatively, step 1010 may be engaged instead of block 1035 in individual viewing cycles according to the capabilities of the viewing equipment or as desired and directed by the person.

In certain embodiments of the invention, the method may be implemented in an RAR apparatus according to an embodiment of the invention.

Certain embodiments of the invention may have applications in surgical procedures. Other applications may also be managed similarly, with some modifications that depend on the particular application. Some examples of applications, not by any means an exhaustive list, are given below.

The object may be a building or portions thereof. The construct model(s) visualized in the AVI may be derived from construction plans. The construct model may include locations of people inside the building, for example, guests, personnel or emergency responders such as firefighters. The corners of the building itself and corners of windows and doors, or the contour lines of the building, may be used as fiducials. The location of the people may be derived from GPS or mobile phone signals. If the object is missing defined points that may serve as fiducials (for example in a disaster-struck area), a laser can generate several beams that serve as artificial indicators to create the fiducials.

As applied in ship navigation, the ship, underwater terrain features and surrounding underwater items may be objects used to generate construct models. The construct models may be generated from underwater scans, such as Sonar, Lidar, map features, etc. Items that are consistently viewed by the person, for example, items inside the control bridge or on parts of the ship visible from the bridge, may serve as fiducials. The navigator's natural view may be augmented with AVI constructs representing, for example, the belly of the ship, underwater obstacles and wildlife, vector representation of the ship's motion (or the motion of any other item, for example, another ship) and the like. A protected volume around the ship may be one of the AVI constructs, which may be dependent on the speed vector of the ship and time to impact, and any penetration of the protected volume may be configured to be accompanied by a visual alarm embedded in the AVI or by an audible alarm.

In an exemplary educational application, the AVI may include AVI constructs representing internal parts of an engine—stationary or in motion during operation.

In the assembly and repair of complex structures, the operator may view an AVI comprising AVI constructs representing parts that need to be installed, removed or moved, how to hold such parts, what screws to install or remove, where to connect electrical probes, etc.

For excavation operators, the AVI may include AVI constructs representing underground cables and pipes while digging next to such elements. The construct model(s) may be generated using, for example, electromagnetic sensors, the coupling of transmission equipment to the cable or pipe, acoustic transmitters and receivers, radiolocation, ground penetrating radar, sonar, etc. Artificial indicators for creating fiducials may be, for example, acoustic or electromagnetic transmitters, blocks of heavy metal, etc. that can be sensed by one or more of the various sensors.

Air traffic controllers may be provided with an AVI comprising AVI constructs representing, for example, airplanes, vehicles, humans, etc. in an airport, including those objects located behind visual obstacles or obscured in a foggy atmosphere. Each airplane and auto may have added features such as a motion vectors and/or warning signs for converging vectors. The construct model(s) may be generated using information from one or more of the following: radar, sonar, millimeter wave radar, thermal imaging cameras, IR cameras, GPS reading from units installed on airplanes and autos, etc. The fiducials may be, for example, objects mounted inside the tower or structures in the airfield visible from the tower(s).

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An apparatus for providing a person with an augmented reality responsive to a scene that the person views, the apparatus comprising:
   a photosensor that images light incident on the photosensor;
   a light projector;
   a controller that controls the projector to project light that generates an augmenting virtual image (AVI) that is not projected onto the scene and having markers corresponding to homologous features in the scene;
   optics that directs light from the scene and light projected by the projector to form a first combined image on the person's retina comprising an image of the scene overlaid by the AVI, and a second combined image comprising an image of the scene overlaid by the AVI on the photosensor;
   wherein the controller configures the AVI responsive to the second combined image so that the markers in the first combined image are substantially coincident with the corresponding homologous features of the scene comprised in the first combined image.

2. The apparatus of claim 1, wherein the apparatus is substantially free of one or more sources of relative dimensional variance between the first combined image and the second combined image selected from the group consisting of: parallax error due to the positioning of the retina of the person and the photosensor, differential chromatic magnification and optical aberrations.

3. The apparatus of claim 1 wherein the optics comprises a mirror that is partially transmitting and partially reflecting.

4. The apparatus of claim 1, wherein the AVI includes an image representing an object within the scene, the image being rendered from a computer code stored in a memory and encoding a three-dimensional representation of the object.

5. The apparatus of claim 4, wherein the computer code is a reconstruction based on one or more captured images of the object.

6. The apparatus of claim 1, wherein the homologous features in the scene are native to the scene.

7. The apparatus of claim 1, wherein the homologous features comprise one or more artificial indicators placed on the scene.

8. The apparatus of claim 1, wherein the optics is configured to make the relative luminance between the image of the scene and the AVI directed to the person substantially the same as relative luminance between the image of the scene and the AVI directed to the photosensor.

9. The apparatus of claim 1, wherein the optics is configured to have light in the combined image reflecting from the retina be directed to the photosensor.

10. The apparatus of claim 1 configured to be incorporated into a head-mounted apparatus.

11. The apparatus of claim 1 configured to be combined with an optical instrument that provides magnification or reduction of the scene.

12. A method for providing a person with an augmented reality, the method comprising:
   rendering an augmenting visual image (AVI) comprising location markers corresponding to selected homologous features in a scene;
   projecting the AVI, wherein the AVI is not projected to the scene;
   directing the AVI and an image of the scene to the person's retina and a photosensor;
   capturing the AVI and the image of the scene;
   comparing positions of the homologous features in the image of the scene with positions of the corresponding location markers in the AVI;
   rendering an adjusted AVI in which the location markers are substantially coincident with the corresponding homologous features in the capture scene image; and
   projecting the adjusted AVI, wherein the AVI is not projected to the scene; and
   directing the adjusted AVI and the image of the scene to the person's retina and the photosensor.

13. The method of claim 12, wherein following directing the adjusted AVI and the image of the scene, the method is repeated from capturing the AVI and the image of the scene.

14. The method of claim 12, wherein the AVI includes an image representing an object within the scene, the image being rendered from a computer code stored in a memory and encoding a three-dimensional representation of the object.

15. The method of claim 14, preceded by creating a new computer code stored in a memory and encoding the three-dimensional representation of the object.

16. The method of claim 15, wherein, following directing the adjusted AVI and the image of the scene, the method is repeated from creating the new computer code encoding the three-dimensional representation of the object.

17. The method of claim 14, wherein the computer code encoding the three-dimensional representation of the object is a reconstruction based on one or more captured images of the object.

18. The method of claim 12, wherein the homologous features in the scene are native to the scene.

19. The method of claim 12, wherein the homologous features in the scene comprise one or more artificial markers placed on the scene.

20. An apparatus for providing a person with an augmented reality responsive to a scene that the person views, the apparatus comprising:
   a photosensor;
   a light projector that projects light that generates an augmenting virtual image (AVI) that is not projected onto the scene;
   optics comprising a partially reflecting flat mirror situated between a scene and the person's retina and also between the projector and the photosensor, the partially reflecting flat mirror being configured to direct portions of the light from the scene to form an image of the scene on the person's retina and on the photosensor, and to direct portions of the light from the projector to form the AVI on the person's retina and on the photosensor so that the image of the scene is overlaid by the AVI on the retina and on the photosensor.

21. The apparatus of claim 20 further comprising an occluder situated between the scene and the optics.

* * * * *

UNITED STATES PATENT AND TRADEMARK OFFICE
CERTIFICATE OF CORRECTION

PATENT NO. : 8,922,589 B2
APPLICATION NO. : 14/053607
DATED : December 30, 2014
INVENTOR(S) : Herzel Laor It is certified that error appears in the above-identified patent and that said Letters Patent is hereby corrected as shown below:

In the Specification

Column 4, line 26, remove "74".

In the Claims

Column 19, line 28, in Claim 1, "virtual" should be changed to --visual--; and

Column 19, line 30, in Claim 1, --and-- should be inserted immediately after "scene;".

Column 20, line 25, in Claim 12, the "and" immediately following "image;" should be removed.

Column 20, line 59, in Claim 20, "virtual" should be changed to --visual--; and

Column 20, line 60, in Claim 20, --and-- should be inserted immediately after "scene;".

Signed and Sealed this
Nineteenth Day of May, 2015

Michelle K. Lee
*Director of the United States Patent and Trademark Office*